United States Patent [19]

Savell

[11] Patent Number: 4,756,147
[45] Date of Patent: Jul. 12, 1988

[54] WEED-TRIMMER-TO-LAWN-MOWER CONVERSION CARRIAGE

[76] Inventor: Kenneth J. Savell, 2101 E. Jerome, Mesa, Ariz. 85204

[21] Appl. No.: 926,126

[22] Filed: Nov. 3, 1986

[51] Int. Cl.$^4$ ............................................. A01D 34/67
[52] U.S. Cl. ...................................... 56/16.7; 56/17.5; 56/255; 56/320.1
[58] Field of Search ...................... 56/16.9, 16.7, 17.2, 56/320.1, 17.5, 320.2, 255

[56] References Cited

U.S. PATENT DOCUMENTS

| | | | |
|---|---|---|---|
| 2,889,641 | 6/1959 | Rechenberg | 56/16.9 |
| 2,938,323 | 5/1960 | Livingston et al. | 56/17.2 |
| 3,343,139 | 8/1967 | Lowry et al. | 56/16.9 |
| 3,350,864 | 11/1967 | Sheps et al. | 56/16.9 |
| 3,774,379 | 11/1973 | Mizobata et al. | 56/17.5 |
| 4,077,191 | 3/1978 | Pittinger, Sr. et al. | 56/17.2 |
| 4,287,709 | 9/1981 | Lowry et al. | 56/16.9 |
| 4,389,836 | 6/1983 | Lowry et al. | 56/16.9 |
| 4,411,126 | 10/1983 | Lowry et al. | 56/17.2 |
| 4,450,673 | 5/1984 | Hutchison | 56/16.9 |
| 4,633,658 | 1/1987 | Nogawa | 56/17.2 |

Primary Examiner—Paul J. Hirsch
Attorney, Agent, or Firm—Cahill, Sutton & Thomas

[57] ABSTRACT

A conventional hand-held weed trimmer of the type including a motor with a flexible cutting line fixed to the output of the motor is provided with a carriage for converting the trimmer into a wheel-mounted lawn mower. The lawn mower consists of a wheel-mounted, planar deck having an open interior portion for receiving the housing of the weed trimmer, and means for supporting the lower skirt portion and protective shield of the motor housing below the plane of the deck. The supporting means comprises means for clamping the rear portion of the skirt to the deck, and a toe-piece for supporting the front portion of the skirt. The deck, or at least the bottom flange of the toe-piece, is flexible enough to allow the forward portion of the trimmer to be tilted downwardly when a downward force is exerted on the trimmer housing. In a first embodiment of the invention, the deck of the carriage is essentially circular, with a key-shaped aperture formed therein. In a second embodiment, the deck comprises a frame made up of a plurality of bars.

13 Claims, 2 Drawing Sheets

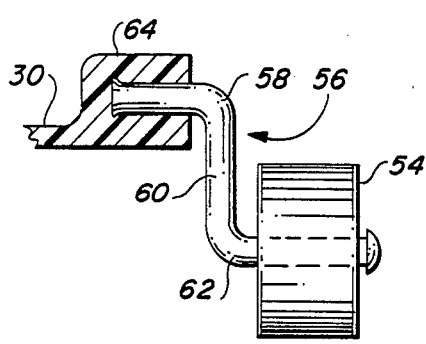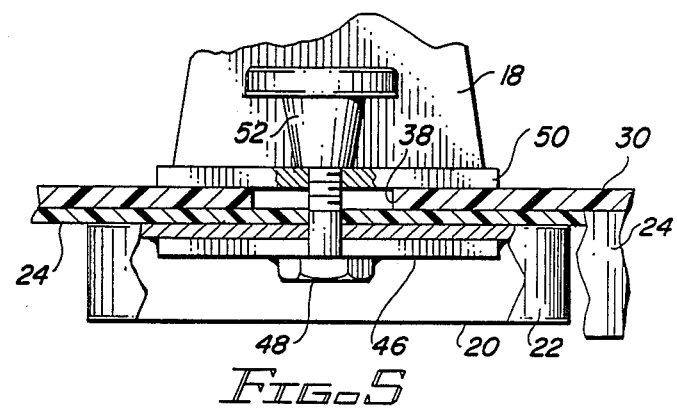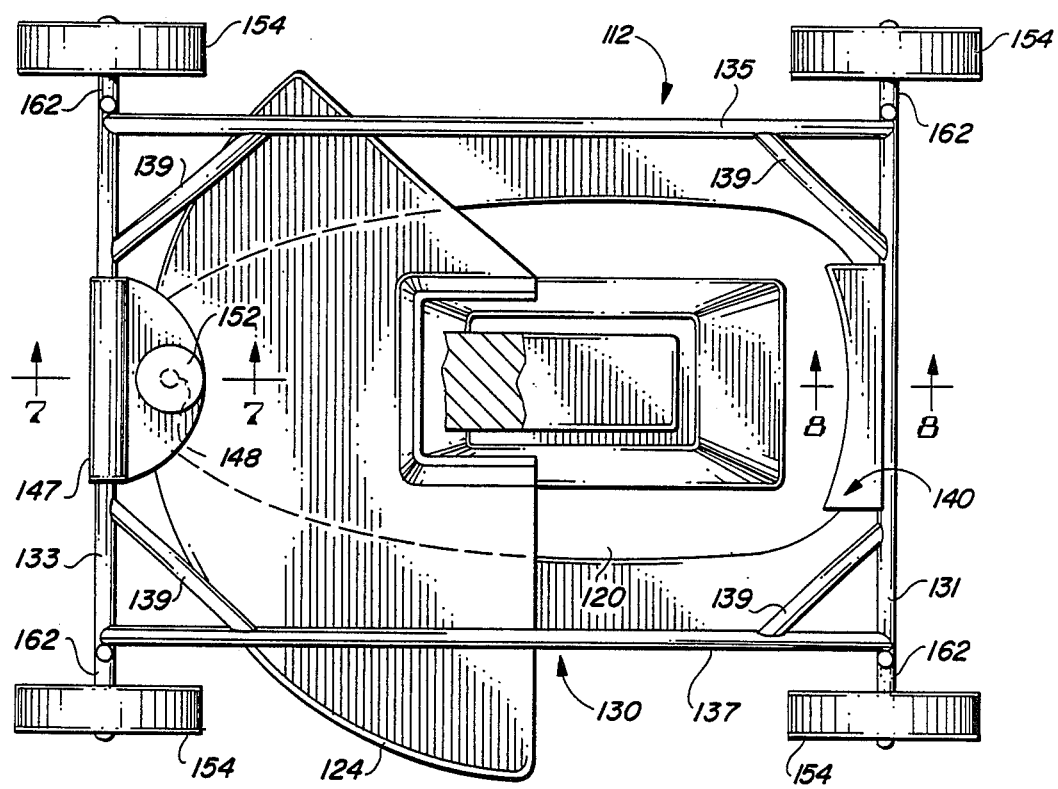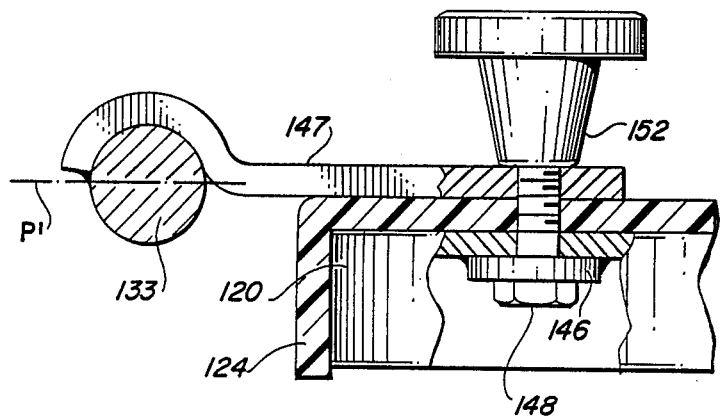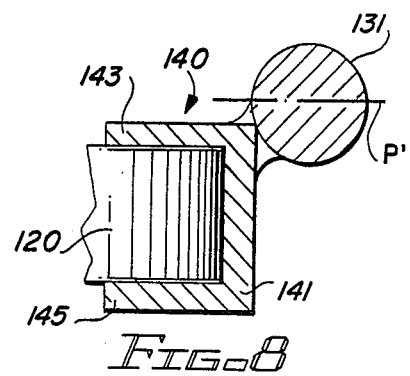

WEED-TRIMMER-TO-LAWN-MOWER CONVERSION CARRIAGE

BACKGROUND OF THE INVENTION

1. Field of the Invention

This invention relates in general to devices for lawn and yard care, and more particularly to a carriage which may be attached to a weed trimmer for converting the trimmer to a lawn mower.

2. Description of the Prior Art

Motor driven lawn care devices generally fall into two categories. The first type of device is the conventional lawn mower, which is a wheel-mounted machine having rotary blades for cutting grass and the like. Lawn mowers are ideal for cutting large expanses of grass in relatively flat, unobstructed areas, because the wheeled carriages allow the operator to move quickly and easily over long distances. However, conventional mowers are not suitable for removing vegetation from around walls, fences, trees, flower beds, and other similar locations because the bulky carriage tends to get in the way, and because the weight of the mower makes it difficult to tilt the device at the angles necessary for efficient edging and scalping. In addition, conventional lawn mowers are expensive to purchase and to maintain, cumbersome to store, noisy, and unpleasant-smelling because of the fuel used to power the engine. These inconveniences may seem minor to property owners having average or large-sized lawns, but to residents or caretakers of apartment complexes, trailer parks, and high-density housing developments with small lawns, the disadvantages of conventional lawnmowers may outweight the benefits.

The second type of motor-driven lawn care device is the weed trimmer. A typical weed trimmer utilizes flexible, non-metallic monofilament cutting line which is rotated at high speeds by a motor output to cut weeds or grass in places that a conventional mower cannot reach. Typically, the motor is enclosed in a housing which includes a protective shield above the cutting line, and is provided with an elongated pole handle for hand-carrying the device. Many property owners, not willing to invest in a large lawnmower for the reasons given above, purchase this type of weed trimmer for mowing their small yards. However, they quickly find that hand-carrying the device is fatiguing due to the weight of the motor. In addition, on certain landscapes, such as hills, the trimmer can be dangerous since they tend to upset the operator's balance.

In order to solve the problems associated with both lawn mowers and weed trimmers, attempts have been made to provide carriages on which trimmers may be removably mounted to convert the trimmers into lawn mowers. These attempts are disclosed in U.S. Pat. Nos. 4,287,709, 4,343,139 and 4,389,836 to Lowry et al.

Each of the carriages disclosed by Lowry et al comprises an enlarged wheeled platform which is provided with a centrally located aperture for receiving the lower portion of the weed trimmer housing. The motor housing, including the protective shield for the cutting line extends above the platform, while the cutting line itself extends below the platform. Rigid coupling means are provided on the platform and on the housing for securely attaching the trimmer to the carriage.

The carriages disclosed by Lowry et al suffer from a number of drawbacks. One problem is that the enlarged platform, which extends well beyond the area of the motor housing, makes it impossible for the trimmer to be used very close to obstructions such as posts or edges of paths and driveways. Also, the pole handle attached to the motor housing is insufficient to move such a large carriage; thus, it is necessary to provide the carriage with a handle of its own. Another problem is that, because the trimmer is supported with its line shield above the platform of the carriage, the operator is unable to take advantage of the automatic line-adjusting feature with which certain popular models of weed trimmers are equipped. This feature, which is marketed under the trade name "Tap-N-Go", enables the operator to automatically advance up to 3 inches of cutting line simply by lightly tapping the cutting head on the ground. However, the carriage disclosed by Lowry et al prevents the head from contacting the ground unless the operator removes the trimmer from the carriage. In addition, the rigid mounting of the trimmer on the carriage prevents the operator from tilting the cutting head to any position other than exactly parallel to the ground, while still maintaining all four wheels of the carriage on the ground. This hinders the performance of the trimmer, since it has been determined that optimum performance is obtained when the front end of the trimmer is actually tilted from 2° to 4° downwardly from parallel with respect to the ground.

Therefore, a need exits for a new and improved weed-trimmer-to-lawn-mower conversion carriage which overcomes some of the problems and shortcomings of the prior art.

SUMMARY OF THE INVENTION

In accordance with the present invention, a new and improved carriage is provided for converting a conventional hand-carried weed trimmer to a wheel-mounted lawn mower.

In a first embodiment of the invention, the carriage comprises a wheel-mounted planar deck having a rear portion which is semi-circular with a radius approximately equal to or slightly greater than the radius of the cutting line shield of the weed trimmer. The forward portion of the deck is also semi-circular, but with a smaller radius to enable the cutting head of the trimmer to come as close as possible to obstructions such as fences or trees. A key hole shaped aperture, consisting of an enlarged central opening in communication with a narrow, rearwardly extending slot, is formed in the deck for encircling the housing of the weed trimmer. In addition, a special toe-piece is provided on the underside of the deck for receiving the forward portion of the skirt of the trimmer motor housing.

The special toe-piece comprises a downwardly extending wall which depends from a portion of the deck just forward of the central opening. A channel is formed in the wall for receiving the forward portion of the skirt of the trimmer housing, while the bottom portion of the skirt rests on a cantilevered flange which projects substantially perpendicularly to the wall in a rearward direction. The cantilevered flange and/or the entire deck is sufficiently flexible and resilient so that when the rear portion of the carriage is rigidly clamped to the rear attachment flange of the trimmer motor housing, a downward force on the trimmer handle will cause the flange or the deck to flex, allowing the trimmer head to be tilited downwardly. This enables the "Tap-N-Go" feature of the trimmer to be used when desired, and also allows the operator to adjust the angle of attack of the line trimmer depending on the thrust of the trimmer and the height of the grass.

In order to attach the carriage to the weed trimmer, one preferably permanent modification must first have been made to the weed trimmer housing. That is, a hole must be drilled in the elongated rear attachment extension of the housing skirt, as well as in the overlying portion of the cutting line shield. A reinforcement plate with a corresponding hole is then placed on the underside of the housing so that all three holes are in alignment, and a bolt is inserted so that its shank projects upwardly through the trimmer housing and shield. The bolt and reinforcement plate are then welded, riveted or otherwise permanently fastened to the underside of the housing to prevent those parts from being lost or otherwise misplaced.

Once the trimmer housing has been modified in the aforementioned manner, the carriage may be attached to the trimmer by placing it over the handle pole of the trimmer so that the enlarged central opening of the deck encircles the pole. Then the deck is slid downwardly over the motor housing of the trimmer until it reaches the skirt portion of the housing. The forward portion of the skirt is then inserted into the special toe-piece on the underside of the deck, and the rear portion of the skirt is rigidly clamped to the rear attachment extension of the deck. To clamp the rear portions of the deck and skirt together, a cross-bar is placed over the deck so that it spans the rearwardly extending slot in the deck and so that a hole formed in the cross-bar receives the upwardly extending shank of the bolt which has previously been secured to the motor housing. An internally threaded fastening knob is then placed over the shank and tightened until the deck of the carriage is securely clamped to the weed trimmer housing.

In a second embodiment of the invention, the deck of the carriage consists of an essentially rectangular wheel-mounted frame. The frame includes a front bar, a rear bar parallel to the front bar, and a pair of spaced apart side bars extending between the front and rear bars. The interior space enclosed by the bars is empty, making the carriage light-weight and easy to maneuver over and around obstructions such as stones and weeds which are taller than the frame.

A special toe-piece, consisting of a channel member with a vertical portion having top and bottom edges, and horizontal top and bottom flanges extending perpendicularly from the top and bottom edges, respectively, of the vertical portion, is secured to the front bar of the frame with the top and bottom flanges of the channel extending rearwardly into the interior of the carriage for receiving the forward portion of the skirt of the trimmer motor housing. As in the first embodiment, the bottom flange of the channel and/or the entire frame is resilient and sufficiently flexible to allow the forward portion of the trimmer to be tilted downwardly when a downward force is exerted on the handle pole.

A heel-piece consisting of an apertured plate is secured to the rear bar of the frame for receiving the upwardly projecting shank of the bolt which has been fixed to the trimmer motor housing in the same fashion as in the first embodiment. Once the carriage has been placed over the trimmer motor housing and the forward portion of the housing skirt has been inserted into the toe-piece, an internally threaded knob is tightened over the bolt in order to securely clamp the rear portion of the carriage to the rear of the weed trimmer housing.

Accordingly, it is an object of this invention to provide an improved carriage for converting a weed trimmer into a lawn mower.

Another object of the invention is to provide a weed-trimmer-to-lawn-mower conversion carriage with means for mounting the trimmer to the carriage in such a way that the motor housing and cutting line shield of the trimmer extend below the deck of the carriage.

Still another object of the invention is to provide a weed-trimmer-to-lawn-mower conversion carriage which is resiliently flexible to allow the forward end of the trimmer to be tilted downwardly for optimum cutting performance.

Yet another object is to provide a weed-trimmer-to-lawn-mower conversion carriage with a reduced-area, lightweight frame which enables the cutting head of the trimmer to come close to obstructions such as fences and trees and to edges of driveways and paths.

The foregoing and other objects of the present invention as well as the invention itself, may be more fully understood from the following description when read in conjunction with the accompanying drawings.

BRIEF DESCRIPTION OF THE DRAWINGS

FIG. 3 is a sectional view taken through line 3—3 of FIG. 2.

FIG. 5 is a sectional view taken through line 5—5 of FIG. 4.

FIG. 6 is a top view of a second embodiment of the carriage of the present invention.

FIG. 7 is an enlarged fragmentary section taken through line 7—7 of FIG. 6.

FIG. 8 is an enlarged sectional view taken through line 8—8 of FIG. 6.

DESCRIPTION OF THE PREFERRED EMBODIMENTS

Figure 1:
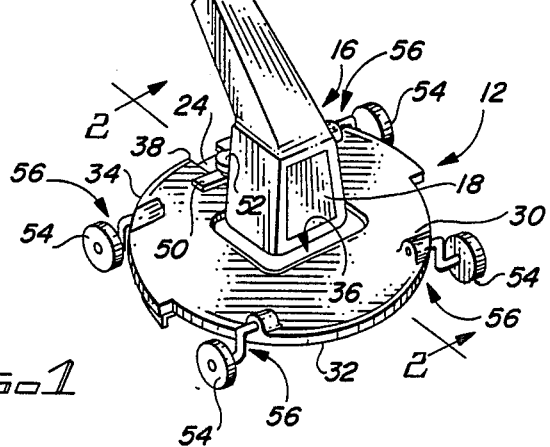
FIG. 1 is a perspective view showing a conventional weed trimmer mounted in a preferred embodiment of the carriage of the present invention.
Figure 2:
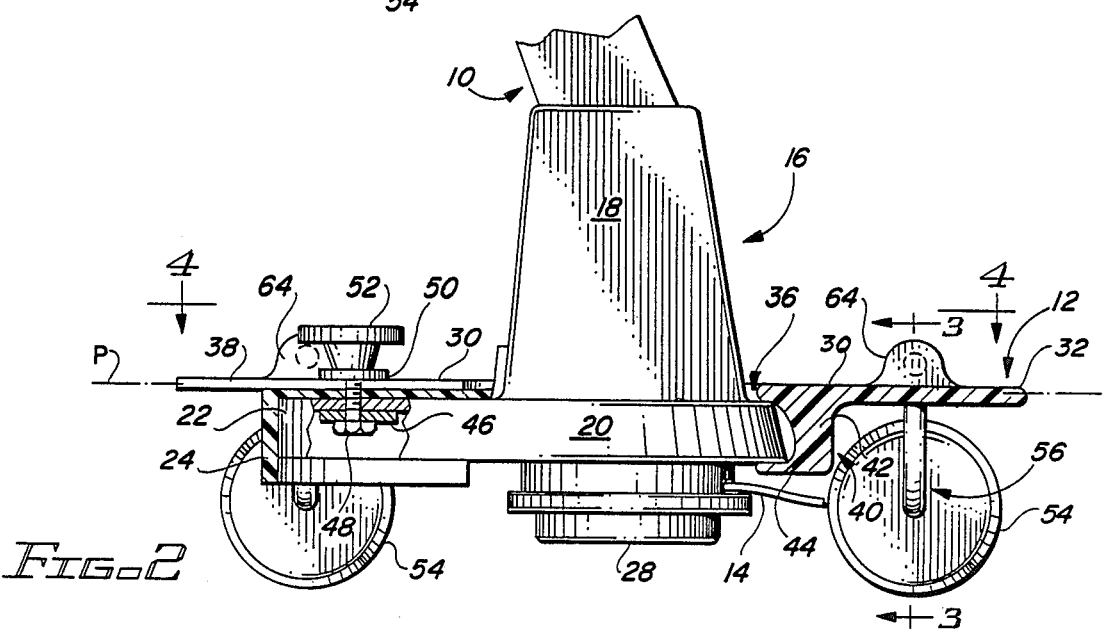
FIG. 2 is an enlarged sectional view taken through line 2—2 of FIG. 1.

Referring more particularly to the drawings, FIG. 1 shows a weed trimmer 10 of conventional construction converted into a lawn mower by means of the carriage 12 of the instant invention.

Figure 4:
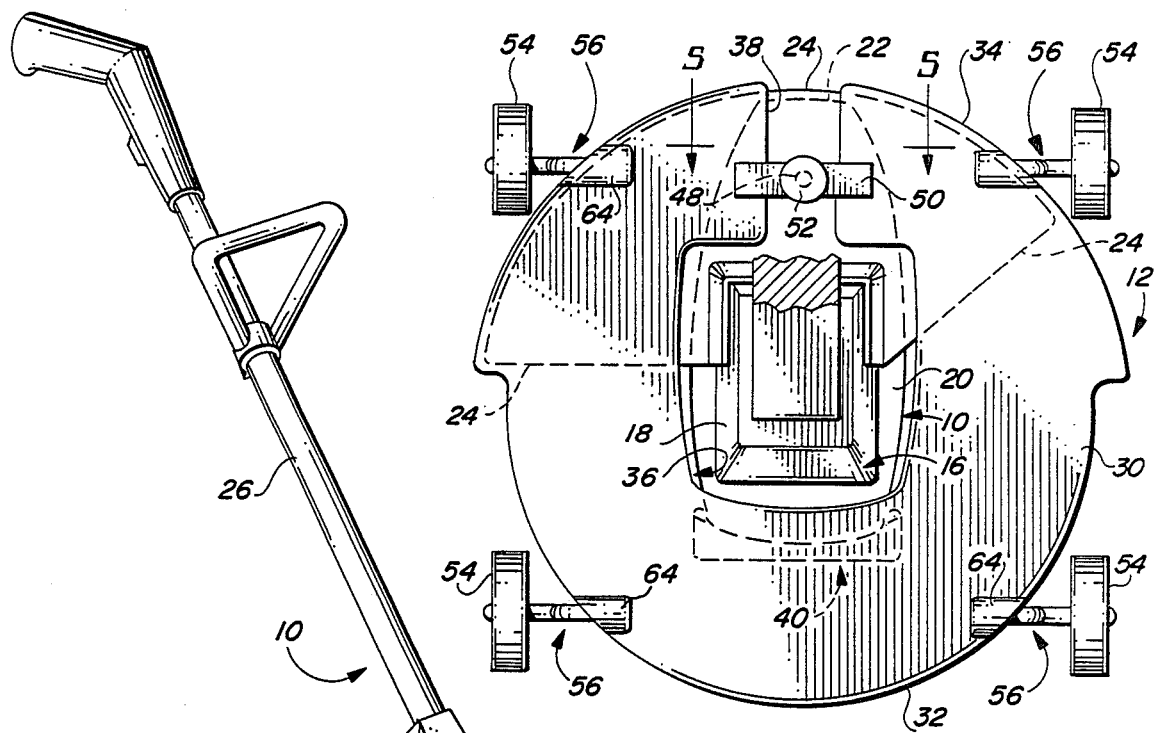
FIG. 4 is a sectional view taken through line 4—4 of FIG. 2.

The weed trimmer, as is well-known in the art, consists of a motor having a flexible, non-metallic monofilament cutting line 14 fixed to its output. Typically, the motor is encased in a housing 16 having an essentially bell-shaped upper portion 18 and a lower skirt portion 20. The lower skirt portion 20 includes an elonagated attachment extension 22 which extends rearwardly with respect to the normal direction of motion of the weed trimmer/lawn mower. A protective shield 24 is fitted over the attachment extension 22 for shielding the cutting line 14. The protective shield 24 is preferably configured as a circular sector of about 120° as shown in phantom in FIG. 4. The housing 16 is also provided with an elongated pole handle 26 for hand-carrying the trimmer. In addition, the trimmer may optionally include a tap button 28, which when tapped or pressed against the ground causes a predetermined length of cutting line 14 to be advanced automatically.

In the first embodiment of the invention, shown in FIGS. 1-5, the carriage 12 comprises a wheel-mounted deck 30 defining a plane P and having semi-circular front and rear portions 32, 34. Preferably the radius of the rear portion 34 is approximately equal to or slightly greater than the radius of the protective shield 24 of the motor housing, while the radius of the front portion 32 is slightly shorter in order to enable the cutting head of the trimmer to be moved as close as possible to obstructions such as fences or trees. In order to provide the desired close trimming capability, it is preferred that the radius of the front portion be such that the edge of the front portion is disposed to substantially match the rotational path of the distal end of the cutting line 14. A key hole shaped aperture 36 consisting of an enlarged central opening in communication with a narrow, rearwardly extending slot 38 is formed in the deck 30 for encircling the housing 16 of the weed trimmer 10. In addition, a special toe-piece 40 is provided on the underside of the deck 30 for receiving the forward portion of the skirt 20 of the trimmer motor housing 16.

The special toe-piece comprises a downwardly extending wall 42 which depends from a portion of the deck just forward of the central aperture. A channel is formed in the wall for receiving the forward portion of the skirt 20, while the bottom portion of the skirt 20 rests on a cantilevered flange 44 which projects perpendicularly to the wall 42 in a rearward direction. The cantilevered flange 44 and/or the deck 30 is formed from a resilient material, such as plastic or sheet metal, which is sufficiently flexible so that when the rear portion 34 of the carriage 30 is rigidly clamped to the rear attachment extension 22 of the trimmer housing skirt 20 as will be described below, a downward force on the trimmer handle 26 will cause the flange 44 and/or the entire deck 30 to flex, enabling tap button 28 to touch the ground if desired.

In order to attach the carriage 12 to the weed trimmer 10, one preferably permanent modification must first have been made to the weed trimmer housing 16. That is, a hole must be drilled in the elongated rear attachment extension 22 of the housing 16, as well as in the overlying portion of the cutting line shield 24. A reinforcement plate 46 with a corresponding hole is then placed on the underside of the housing so that all three holes are in alignment, and a bolt 48 is inserted so that the shank of the bolt projects upwardly through the trimmer housing and shield. The bolt 48 and reinforcement plate 46 are then welded, riveted or otherwise permanently fastened to the underside of the housing to prevent those parts from being lost or misplaced.

Once the trimmer housing 16 has been modified in the aforementioned manner, the carriage 12 may be attached by placing it over the handle pole 26 of the trimmer 10 so that the enlarged central opening of the deck 30 encircles the pole 26. Then the deck 30 is slid downwardly over the motor housing 18 of the trimmer 10 until it reaches the skirt portion 20 of the housing. The forward portion of the skirt 20 is then inserted into the special toe-piece 40 on the underside of the deck 30, and the rear attachment extension 22 of the skirt 20 is rigidly clamped to the rear portion of the deck 30. To clamp the rear portions of the deck 30 and the skirt 20 together, a cross-bar 50 is placed over the deck so that it spans the rearwardly extending slot 38 in the deck so that a hole formed in the cross-bar 50 receives the upwardly extending shank of the bolt 48 which has been previously secured to the motor housing. An internally threaded fastening knob 52 is then placed over the shank and tightened until the deck of the carriage is securely clamped to the weed trimmer housing.

In order to enable the trimmer/lawn mower to be maneuvered as closely as possible to various types of obstructions, it is preferred that the wheels 54 for the carriage 12 be relatively small in diameter. At the same time, however, it is necessary that the carriage 12 be sufficiently elevated with respect to the ground for the cutting head to operate properly, and to give adequate clearance for small rocks and the like which may lie in the path of the trimmer. In order to satisfy both of these requirements, it is necessary for the wheels 54 to be mounted on specially designed offset shafts 56, as best seen in FIG. 3. Each shaft includes a substantially horizontal mounting portion 58 for attaching the wheel to the carriage deck 30, a substantially vertical mid-portion 60, and a substantially horizontal axle portion 62 extending outwardly at a right angle from the mid-portion 60, for rotatably carrying the wheel 54. The mounting portion 58 of each shaft 56 is carried in a different one of four raised bearing elements 64 which projects upwardly from near the edge of the carriage deck 30.

In a second embodiment of the invention, shown in FIGS. 6–8, the carriage 112 consists of an essentially rectangular deck or frame 130 having suitable wheels 154 rotatably carried on the axle shafts 162. The frame includes a front bar 131, a rear bar 133 parallel to the front bar, and a pair of spaced apart side bars 135, 137 extending between the front bar 131 and the rear bar 133. All of the bars 131, 133, 135 and 137 lie within a common plane P'. If necessary, reinforcement bars 139 may be extended diagonally between adjoining bars of the frame in order to rigidify the carriage. Otherwise, the interior space enclosed by the bars 131, 133, 135, and 137 is empty, making the carriage 112 light-weight and easy to maneuver over and around obstructions such as stones and weeds which are taller than the frame.

A special toe-piece 140, consisting of a channel member with a vertical portion 141 having top and bottom edges, and horizontal top and bottom flanges 143, 145 extending perpendicularly from the top and bottom edges of the vertical portion 141, is secured to the front bar 131 of the tubular frame 130, with the top and bottom flanges 143, 145 extending into the interior of the cariage 130 for receiving the forward portion of the skirt 120 of the trimmer motor housing. As in the first embodiment, the bottom flange 145 of the toe-piece 140 and/or the entire tubular frame 130 is made from a material which is resilient and sufficiently flexible to allow the forward portion of the trimmer to be tilted downwardly when a downward force is exerted on the handle pole.

A heel-piece 147, consisting of an apertured plate, is secured to the rear bar 133 of the tubular frame 130 for receiving the upwardly projecting shank of the bolt 148 which extends through reinforcement plate 146, skirt 120 of the trimmer motor housing, and cutting line shield 124 in the same fashion as in the first embodiment. Once the carriage 112 has been placed over the trimmer motor housing and the forward portion of the housing skirt 120 has been inserted into the toe-piece 140, an internally threaded knob 152 is tightened over the bolt 148 to securely clamp the rear portion of the carriage to the rear of the weed trimmer housing.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

I claim as my invention:

1. A weed-trimmer-to-lawm mower conversion assembly, said assembly comprising:
   (a) a weed trimmer including a motor having a cutting line driven in a circular path by the motor, said motor having a housing with a lower skirt portion having a front end and a rearwardly extending elongated rear portion with a protective shield mounted thereon, said housing further including an upwardly extending handle pole for hand-carrying said trimmer;
   (b) a carriage for supporting said weed trimmer, said carriage including a wheel-mounted deck defining a plane with an opening therein and having a front and rear, said deck being formed from a sufficiently flexible material to allow said deck to flex downwardly when a downward force is exerted on the handle of said trimmer; and
   (c) cooperating elements of a demountable interconnection means on said deck and on said weed trimmer for demountably attaching said deck to said weed trimmer in a position wherein said skirt and said shield of said trimmer are disposed substantially below the plane defined by said deck and the motor of said weed trimmer extends upwardly through the opening defined by said deck.

2. The assembly of claim 1 wherein the cooperating elements of a demountable interconnection means comprises:
   (a) a toe-piece means carried by said deck at the front thereof proximate the opening defined thereby, said toe-piece means defining a channel which is located below the plane of said deck and opens toward the rear of said deck, said channel demountably and nestingly receiving the front end of the lower skirt portion of the weed trimmer; and
   (b) clamping means attached to the elongated rear portion of the weed trimmer and to said deck for demountably holding the rear portion and the shield and the skirt of said weed trimmer in a position below the plane defined by said deck.

3. The assembly of claim 2, in which said deck comprises an essentially semi-circular front portion defining a forward edge.

4. The assembly of claim 3, in which the radius of said front portion of said deck is such that said forward edge is disposed to overlay and substantially match the rotational path of the distal end of the cutting line of the trimmer.

5. The assembly of claim 3, wherein the rear end of said deck defines a rear edge which overlays and substantially matches the peripheral configuration of the protective shield of the trimmer.

6. The assembly of claim 5, in which said opening in said deck comprises a key hole shaped aperture consisting of an enlarged central opening in communication with a narrow, rearwardly extending slot.

7. The assembly of claim 6, in which said clamping means comprises:
   (a) bolt means having a threaded shank, said bolt means being for attachment to the rear end of the skirt of the trimmer so that the threaded shank extends upwardly therefrom through the protective shield of the trimmer and passes upwardly through the slot of the opening defined by said deck when said deck is assembled to the trimmer;
   (b) a cross-bar for placement atop said deck so as to span the slot of the opening defined by said deck, said cross-bar having an aperture through which the threaded shank of said bolt means passes when said deck is assembled to the string trimmer and said cross-bar is placed atop said deck; and
   (c) knob means for threaded attachment to the upper end of the threaded shank of said bolt means and tightenable thereon for clampingly holding said deck between said cross-bar and the shield of the trimmer when said deck is assembled to the trimmer and said cross-bar is placed atop said deck.

8. A weed-trimmer-to-lawn-mower conversion assembly, said assembly comprising:
   (a) a weed trimmer including a motor having a flexible, non-metallic cutting line driven in a circular path by the motor, said motor having a housing with a lower skirt portion having a front end and a rearwardly extending elongated rear portion with a protective shield mounted thereon, said housing further including an upwardly extending handle pole for hand-carrying said trimmer;
   (b) a tap button extending downwardly from said motor for advancing a predetermined length of cutting line when said tap button is tapped on the ground;
   (c) a carriage for supporting said weed trimmer, said carriage including a wheel-mounted deck defining a plane with an opening therein and having a front and rear, said deck being formed from a sufficiently flexible material to allow said deck to flex downwardly and said tap button to touch the ground when a downward force is exerted on the handle of said trimmer; and
   (d) cooperating elements of a demountable interconnection means on said deck and on said weed trimmer for demountably attaching said deck to said weed trimmer in a position wherein said skirt and said shield of said trimmer are disposed substantially below the plane defined by said deck and the motor of said weed trimmer extends upwardly through the opening defined by said deck.

9. A carriage for converting a hand-carried weed trimmer to a wheeled lawn mower, wherein the trimmer includes a motor having a flexible cutting line driven in a circular path by the motor, the motor having a housing with a skirt on the lower end thereof, the skirt having a front end and an elongated rear end with a protective shield mounted thereon, said carriage comprising:
   (a) a deck for assembly to the trimmer, said deck being formed from a resiliently flexible material and defining a plane with an opening therein and having front and rear ends;
   (b) wheel means coupled to said deck for movably supporting said deck with the plane defined thereby being in a substantially horizontal attitude above a ground surface; and
   (c) cooperating elements of a demountable interconnection means on said deck and for attachment to the trimmer for demountably attaching said deck to the trimmer in a position wherein the skirt and the shield of the trimmer are disposed substantially below the plane defined by said deck and the motor of the trimmer extends upwardly through the opening defined by said deck, said cooperating elements including,
- I. resiliently flexible toe-piece means carried by and integral with said deck at the front end thereof proximate the opening defined thereby, said toe-piece means defining a channel below the plane of said deck which opens toward the rear of said deck, said channel being for demountably and nestingly receiving the front end of the skirt of the trimmer; and
- II. clamping means for attachment to the elongated rear end of the skirt of the trimmer and for attachment to said deck for holding the rear end of the skirt and the shield of the trimmer in a position below the plane defined by said deck.

10. A carriage for a weed trimmer of the type including a motor having a cutting line fixed to its output and a housing for said motor, said housing including an essentially bell-shaped upper portion and a skirt portion on the lower end thereof, said skirt portion including a front portion and a rearwardly extending elongated rear portion with a protective shield carried thereon, said carriage comprising:
- (a) a planar wheel-mounted deck for assembly to the trimmer, said deck having a top surface and a bottom surface and having an essentially key hole shaped aperture formed herein, said aperture including an enlarged central opening for surrounding said bell-shaped upper portion of said trimmer motor housing, and a relatively narrow slot extending rearwardly from said central opening; and
- (b) cooperating elements of a demountable interconnection means on said deck and for attachment to the trimmer for demountably attaching said deck to the trimmer in a position wherein said skirt and the shield of the trimmer are disposed substantially below the bottom surface of said deck and said bell-shaped upper portion of the housing of the trimmer extends upwardly through said enlarged central opening in said deck said cooperating elements of a demountable interconnection means including,
  - I. toe-piece means carried by said deck proximate said enlarged central opening, said toe-piece including a downwardly-extending wall formed forwardly of said opening, said wall defining a channel which opens toward the rear of said deck for demountably and nestingly receiving the front end of the skirt of the trimmer, the bottom of said channel being defined by a cantilevered flange projecting rearwardly and substantially perpendicularly to said downardly extending wall, and
  - II. clamping means for attachment to the elongated rear end of the skirt of the trimmer and for attachment to said deck for holding the rear end of the skirt and the shield of the trimmer in a position below the bottom surface of said deck, said clamping means comprising,
    - (i) bolt means having an externally threaded shank, said bolt means being for attachment to the rear end of the skirt of the trimmer so that the threaded shank extends upwardly through the slot of the opening defined by said deck when said deck is assembled to the trimmer,
    - (ii) a cross-bar for placement atop said deck so as to span the slot of the opening defined by said deck, said cross-bar including an aperture through which the threaded shank of said bolt means passes when said deck is assembled to said trimmer and said cross-bar is atop said deck, and
    - (iii) knob means for threaded attachment to the threaded shank means of said bolt and tightenable thereon for clampingly holding said deck between said cross-bar and the shield of said trimmer when said deck is assembled to said trimmer and said cross-bar is atop said deck.

11. The carriage of claim 10, wherein the protective shield of said trimmer motor housing is configured as a segment of a circle, said segment defining an arc of approximately 120°, and in which said deck of said carriage comprises an essentially semi-circular rear portion having a radius approximately equal to the radius of said protective shield, and an essentially semi-circular front portion having a radius less than the radius of said rear portion in order to allow usage of the trimmer near obstructions.

12. A carriage for a weed trimmer of the type including a motor having a cutting line fixed to its output and a housing for said motor, said housing including a skirt having a forward portion and a rearwardly extending elongated rear portion with a protective shield mounted thereon, said carriage comprising:
- (a) a wheel-mounted deck, said deck comprising a frame including a front bar and a rear bar, said front and rear bars lying in a common plane essentially horizontal to and elevated with respect to the ground;
- (b) toe-piece means secured to said front bar of said frame, said toe-piece means defining a channel located below the plane defined by said front and rear bars of said deck end which opens toward said rear bar, said channel being for demountably and nestingly receiving the front end of said skirt portion of the weed trimmer; and
- (c) clamping means for attachment to the elongated rear end of the skirt and the shield of the weed trimmer and for attachment to said deck for holding the rear end of the skirt and the shield in a position below the plane of said front and rear bars of said deck, said clamping means including,
  - I. heel-piece means including a forwardly extending plate secured to said rear bar of said frame and lying in the common plane of said rear bar and said front bar, said plate having an aperture formed therein,
  - II. bolt means including a threaded shank, said bolt means being for attachment to the rear end of the skirt of the trimmer so that the threaded shank extends upwardly through the protective shield of the trimmer and passes upwardly through the aperture of said heel-piece when said deck is attached to the trimmer, and
  - III. knob means for threaded attachment to the threaded shank of the bolt means and tightenable thereon for clampingly holding the shield and the rear end of the skirt of the trimmer to the underside of said plate of said heel-piece when said bolt means is attached to the trimmer and said deck is assembled thereto.

13. A carriage for converting a hand-carried weed trimmer to a wheeled lawn mower, wherein the trimmer includes a motor having a flexible cutting line driven in a circular path by the motor, the motor having a housing with a skirt on the lower end thereof, the skirt having af ront end and an elongated rear end with a protective shield mounted thereon, said carriage comprising:

(a) a deck for assembly to the trimmer, said deck defining a plane with an opening therein and having front and rear ends, said deck comprising a frame of substantially rectangular configuration including a front bar, a rear bar, and a pair of side bars extending between opposite ends of said front and rear bars;

(b) wheel means coupled to said deck for movably supporting said deck with the plane defined thereby being in a substantially horizontal attitude above a ground surface; and (c) cooperating elements of a demountable interconnection means on said deck and for attachment to the trimmer for demountably attaching said deck to the trimmer in a position wherein the skirt and the shield of the trimmer are disposed substantially below the plane defined by said deck and the motor of the trimmer extends upwardly through the opening defined by said deck, said cooperating elements including, I. toe-piece means carried by said deck at the front thereof proximate the opening defined thereby, said toe-piece means defining a channel below the plane of said deck which opens toward the rear of said deck, said channel being for demountably and nestingly receiving the front end of the skirt of the trimmer; and II. clamping means for attachment to the elongated rear end of the skirt of the trimmer and for attachment to said deck for holding the rear end of the skirt and the shield of the trimmer in a position below the plane defined by said deck, said clamping means including, i. heel-piece means including a forwardly extending plate affixed to said rear bar of said frame and laying in the plane of said deck, said plate having an aperture formed therein;

ii. bolt means having a threaded shank, said bolt means being for attachment to the rear end of the skirt of the trimmer so that the threaded shank extends upwardly therefrom through the protective shield of the trimmer and passes upwardly through the aperture of said heel-piece when said deck is assembled to the trimmer; and iii. knob means for threaded attachment to the upper end of the threaded shank of said bolt means and tightenable thereon for clampingly holding the shield and rear end of the skirt of the trimmer to the underside of said plate of said heel-piece when said bolt means is attached to the trimmer and said deck is assembled thereto.

* * * * *